United States Patent [19]
Peterson

[11] Patent Number: 6,073,108
[45] Date of Patent: *Jun. 6, 2000

[54] TASK-BASED CLASSIFICATION AND ANALYSIS SYSTEM

[75] Inventor: Andrew C. Peterson, Long Beach, Calif.

[73] Assignee: Paul, Hastings, Janofsky & Walker, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/668,579

[22] Filed: Jun. 21, 1996

[51] Int. Cl.$^7$ ............................................. G06F 17/60

[52] U.S. Cl. ................. 705/8; 705/7; 705/9; 705/30; 705/34

[58] Field of Search ................................ 705/8, 9, 7, 30, 705/34

[56] References Cited

U.S. PATENT DOCUMENTS

| | | | |
|---|---|---|---|
| 5,077,666 | 12/1991 | Brimm et al. ............................... | 705/2 |
| 5,175,681 | 12/1992 | Iwai et al. .................................. | 705/9 |
| 5,182,705 | 1/1993 | Barr et al. .................................. | 705/11 |
| 5,189,608 | 2/1993 | Lyons et al. ............................... | 705/30 |
| 5,311,423 | 5/1994 | Clark ........................................... | 705/8 |
| 5,325,290 | 6/1994 | Cauffman et al. ......................... | 705/34 |
| 5,329,447 | 7/1994 | Leedom, Jr. ................................. | 705/9 |
| 5,343,387 | 8/1994 | Honma et al. ............................... | 705/9 |
| 5,530,861 | 6/1996 | Diamant et al. ............................ | 705/8 |
| 5,566,333 | 10/1996 | Olson et al. ............................. | 707/102 |
| 5,991,742 | 11/1999 | Tran ........................................... | 705/41 |

OTHER PUBLICATIONS

Heck, Mike. "Primavera's Sure Trak Answers Midsize Scheduling Needs," InfoWorld, vol. 17, No. 15, pp. 71–3, Apr. 10, 1995.

England, Cheryl. "Taking Care of Business," MacUser, vol. 11, No. 4, pp. 92–99, Apr. 1995.

J. Mallory, "Software for Windows captures billable time," Newsbytes, Jun. 20, 1994.

"Timeslips 5." Law Office Technology Review, vol. 2, No. 5–1, May 7, 1992.

"A junior partner to manage your workflow," Law Office Technology Review, vol. 3, No. 4, Apr. 29, 1994.

"A lawyer's PIM plus," Law Office Technology Review, vol. 4, No. 4, Apr. 6, 1995.

"Case management with Abascus Law +,"Law Office Technology Review, vol. 4, No. 92, Sep. 25, 1995.

"PCLAWjr to automate the small law firm," Law Office Technology Review, vol. 2, No. 3–3, Mar. 24, 1992.

Primary Examiner—Eric W. Stamber
Assistant Examiner—Jason W. Rhodes
Attorney, Agent, or Firm—Oppenheimer Wolff & Donnelly LLP

[57] ABSTRACT

A task-based classification and analysis system includes an analysis software module and a user interface. The analysis software module establishes and maintains relationships between a plurality of databases or, in a preferred embodiment, hierarchical task lists. The user interface provides user inputs to the analysis software module such as budget information which is associated with particular elements of the databases. In consideration of historical data models, the user inputs and predetermined relationships between elements of the databases, the preferred system generates information products such as task-based budgets. Another preferred system coordinates task relationships between a plurality of software modules, such as a billing software module and a time entry software module.

16 Claims, 12 Drawing Sheets

TASK-BASED CLASSIFICATION AND ANALYSIS SYSTEM

BACKGROUND OF THE INVENTION

1. Field of the Invention

The present invention relates to a system for coordinating task relationships and, more particularly, pertains to a task-based classification and analysis system for building and maintaining relationships between hierarchical task lists and for generating task-based budgets and variance reports. The task-based classification and analysis system employs historical cost information to adjust future budgets and charges in consideration of selected factors such as perceived benefit and value of the services, thereby allowing businesses to more effectively exploit the skills and experiences of their employees. The task-based classification and analysis system additionally enables businesses to accommodate the particular accounting needs and preferences of valued clients by establishing and maintaining relationships between different sets of task lists preferred by the business and its clients, respectively.

2. Description of the Related Art

U.S. Pat. No. 5,182,705 to Barr et al. discloses a computer system and method for work management. Staff Tables are used to maintain authority levels for access to certain functions such as billing, docketing, etc. The disclosed system also includes an Activity Log used to track billing. Accessed information such as a description of the work done and the time spent are then directly fed into an automatic billing function. Additionally, a Local Data function facilitates the customization of data recordation and output at a local level.

U.S. Pat. No. 5,329,447 to Leedom, Jr. discloses a high integrity computer implemented docketing system which detects improperly entered information. Information fields of the system may be changed to serve the needs of a particular user.

U.S. Pat. No. 5,343,387 to Honma et al. discloses a cyclic maintenance work schedule table preparation system which includes a worker data memory for storing scheduled work information of individual workers.

Although a variety of docketing, time entry and billing software systems are known, the prior art is devoid of a system which establishes and maintains relationships between a plurality of hierarchical task lists and which utilizes historical cost information to generate task-based budgets and other information products.

Accordingly, an object of the present invention is to provide a task-based classification and analysis system which generates task-based budgets for professional service providers.

Another object is to provide a system which generates task-based budgets for particular matters or projects.

Another object is to provide a system where information is collected, organized and retrieved within a task-based paradigm.

Another object is to provide a system which maintains and updates associations between elements of a master task list and elements of other task lists.

Another object is to provide a system which facilitates the creation of different task lists responsive to the particular needs of a client or clients.

Another object is to provide a system which associates elements of task lists with task codes.

Another object is to provide a system which establishes and maintains preestablished relationships between different sets of task codes.

Another object is to provide a system where the information comprising the task lists is hierarchically organized.

Another object is to provide a system which establishes and maintains relationships between a plurality of hierarchical task lists.

Another object is to provide a system which coordinates task relationships between a plurality of software modules, such as a billing software module and a time entry software module.

Another object is to provide a system which employs historical cost information for the purpose of adjusting charges for particular services in response to changes in actual costs, perceived value and other factors.

SUMMARY OF THE INVENTION

In accordance with a specific illustrative embodiment of the present invention, a task-based classification and analysis system includes an analysis software module and a user interface. The analysis software module receives cost information from at least one other software module and maintains predetermined relationships between a plurality of hierarchical task lists utilized by the analysis software module and the at least one other software module. The hierarchical task lists include a first task list and a second task list; the analysis software module generates the second task list from selected elements of the first task list in response to user inputs. The user interface includes pull-down menus for providing the user inputs to the analysis software module. The analysis software module generates task-based budgets from the cost information.

In a broader aspect of the present invention, the task-based classification and analysis system includes an analysis software module for coordinating relationships between a plurality of task lists and for generating reports.

Another aspect of the present invention is a memory device for a task-based classification and analysis system including a computer readable storage medium embodying a computer executable program for building task-based budgets and coordinating relationships between a plurality of task lists.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 10 shows the project task description input window of FIG. 9 after a custom description of a project task has been input;

FIG. 11 shows the project task description input window of FIG. 10 after a New Budget Entry window has been activated and information has been entered thereinto by the user.

DETAILED DESCRIPTION OF THE PREFERRED EMBODIMENTS

Figure 1:
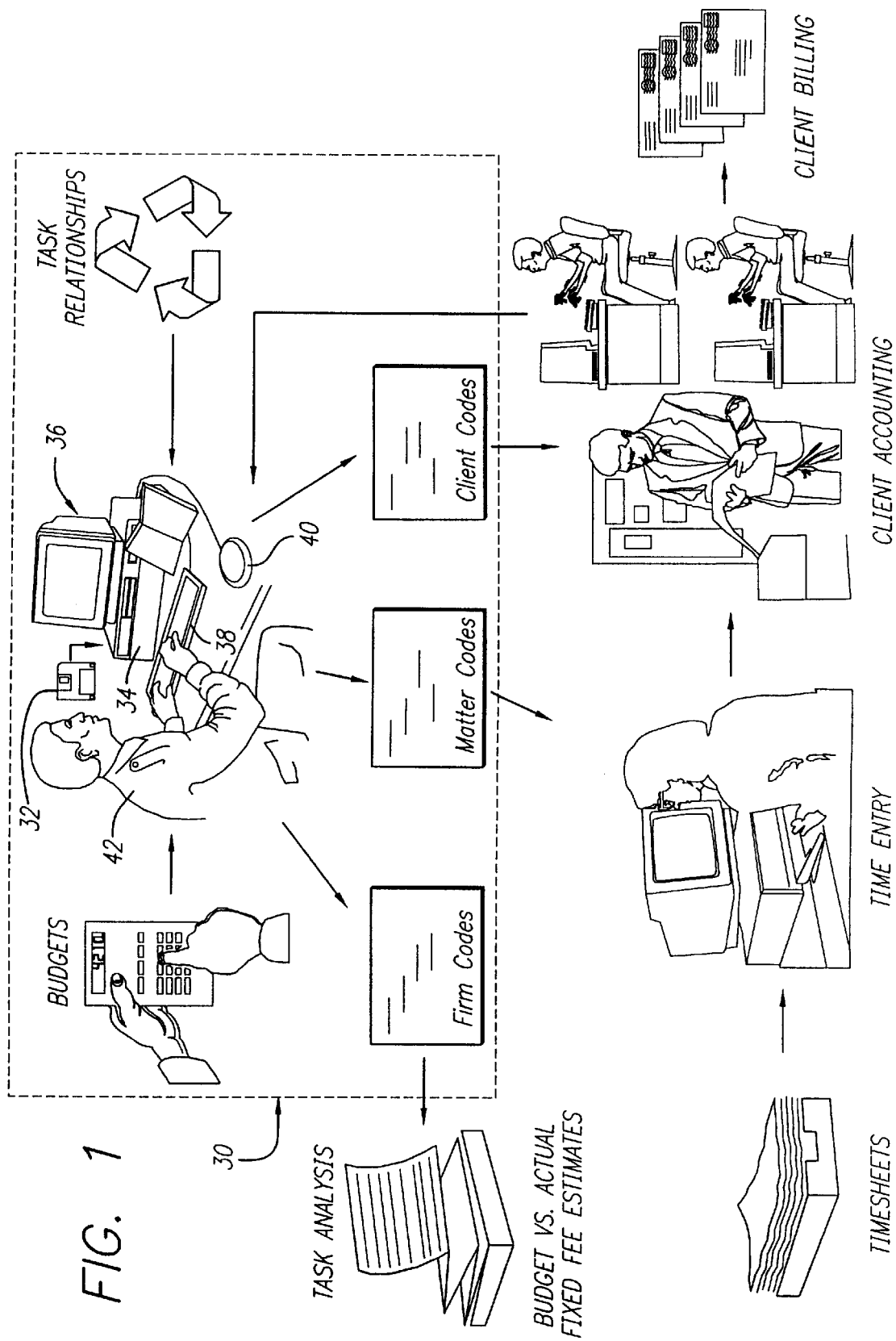
FIG. 1 is a functional diagram of a preferred embodiment of the task-based classification and analysis system of the present invention.

FIG. 1 is a functional diagram of a preferred embodiment of a task-based classification and analysis system 30 according to the present invention. Generally, the system 30 serves as a tool for establishing and maintaining relationships between a plurality of data bases. The aforementioned data bases may comprise, for example, a plurality of task lists created to serve the particular needs of different entities, such as the accounting department of a firm, project managers within the firm, and clients of the firm. The task-based classification and analysis system 30 identifies changes to elements in any of these data bases and facilitates the remapping of associations between particular elements of the respective data bases to maintain a set or sets of predetermined relationships.

The software aspects of the task-based classification and analysis system 30 are preferably embodied in a computer executable file stored on a memory device 32 and executed by a personal computer (PC) 34. In addition and/or alternatively, the system 30 application may be maintained on a Microsoft Windows NT/SQL Server platform. The task-based classification and analysis system 30 further comprises a user interface including a video display 36 and user input mechanisms such as a keyboard 38 and a mouse 40. Alternatively, other user input mechanisms such as pen mouses, voice recognition mechanisms and the like may be employed. Generally, the user interface allows a user of the system 30 to alter elements of the data bases. Particular features of the user interface will be discussed later in greater detail.

A particular advantage of the task-based classification and analysis system 30 is its use of codes which are associated with elements of the data bases. Consequently, information may be processed or exported from the system 30 in association with particular codes. For example, and as illustrated in FIG. 1, the system 30 may export Matter Codes and, optionally, additional information associated therewith. The system 30 also exports information pertaining to the relationships between different sets of codes.

With regard to the preferred embodiment illustrated in FIG. 1, the plurality of data bases discussed above consists of a firm task list, matter task lists and client task lists. Codes are associated with elements of these task lists. Firm task codes are associated with elements of the firm task list. Matter task codes are associated with elements of the matter task lists. Clients task codes are associated with elements of the client task lists. Matter task codes may also be referred to as project task codes.

The codes and, in some instances, information associated with the codes, may be provided to another processor or software module. The matter task codes of the preferred embodiments may be employed in a variety of ways; for example, such codes may be subsequently associated with data from timesheets provided to a commercially available time entry software module such as Carpe Diem. In the preferred embodiment of the present invention, the matter task list is the source from which Carpe Diem time allocation codes are created. As shown in FIG. 1, timesheet data associated with the matter task codes may then be provided to yet another commercially available software module such as a billing software module, e.g., the Elite Legal Billing System (ELBS). Preferably, the task-based classification and analysis system 30 facilitates an orderly exchange of information and/or code sets between the system 30 itself and at least one other software module. Significantly, the system 30 maintains relationships between elements of different data bases (e.g., task lists) independent of whether changes in these elements are made through the user interface of the system 30 or by a user of a software module in communication with the system 30.

The development of a global task list structure is central to the task-based classification analysis system 30. Such a structure provides for rigorous linkage between a standard set of tasks (e.g., the firm task list), tasks specific to a matter or project (matter task lists), and tasks defined by clients (client task lists). The linkage structure is programmed to be sufficiently flexible to accommodate frequent and extensive changes to the different sets of task lists while preserving relationships between the task lists. Changes to a particular task list are tracked so that previously entered data will always match up with a current task item for reporting and analysis purposes. A task code table embodying relationships between the different sets of task codes is remapped as necessary to track additions, deletions or changes to the task lists.

A single task list preferably (but not necessarily) serves as a basic template from which all other task lists are developed. Such a "master" task list reflects how tasks are organized on a firm-wide level and serves as an organizational model through which reports are generated. In the preferred embodiment, the matter (or project) task list serves as a "master" task list. As may be readily appreciated, the aforementioned basic template may consist of other lists or data structures and is not necessarily hierarchical in structure.

For each matter or project, a matter task list is created. Elements of a matter task list consist of selected elements of the firm task list which are copied and, if desired, renamed to accommodate the organizational or other needs of a particular matter or project.

A client task list is a representation of a client's preferred task organization for billing and reporting. The data structure and processes associated with the client task lists are similar to those of the firm task list, but allow for multiple client-based lists.

Another particular advantage of the task-based classification and analysis system 30 is that it provides a means for task-based budget building with or without consideration of relevant historical cost information. For example, the system 30 may collect and utilize historical data from another software module.

Task-based budgets and the resulting task-based billings allow a service provider, such as a law or accounting firm, to better exploit existing skills and experience, permitting future charges to be assigned based on actual cost projections or based on a perceived benefit/value basis. The task-based classification and analysis system 30 generates task-based information products including task-based budgets and (optionally) variance reports from one or more of: historical cost information, information provided by other software modules, and user inputs. During the creation of a matter task list, budget entries and user descriptions are stored. The system 30 additionally tracks and maintains the integrity of budget information in response to changes in budget entries.

As discussed below, the task-based classification and analysis system 30 may be conceptualized as including an analysis software module for developing task-based budgets and coordinating task relationships.

Figure 2:
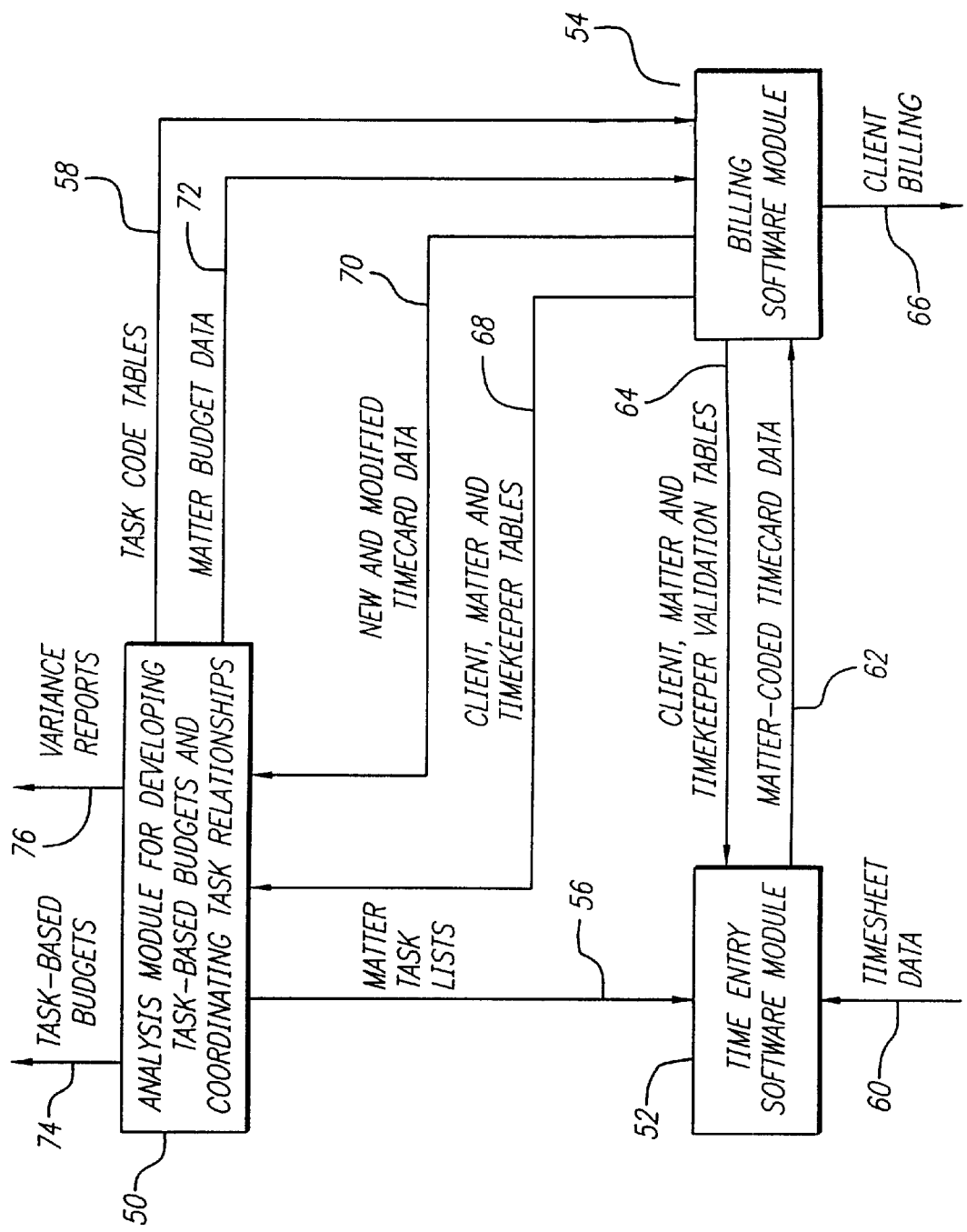
FIG. 2 is a block diagram of a functional interface between an analysis software module of the present invention and time entry and billing software modules.

FIG. 2 is a block diagram of a functional interface between an analysis software module 50 of the present invention and a time entry software module 52 and a billing software module 54. The analysis software module 50 generates and provides matter task lists 56 to the time entry software module 52. With Carpe Diem as the time entry software module 52, the matter task list as well as a matter update record (indicating whether the client or matter record is to be used for validation) are placed in the Carpe Diem import directory, and thereafter automatically transferred to the Carpe Diem validation tables.

The analysis software module 50 also provides task code tables 58 to the billing software module 54. The task code tables 58 embody predetermined relationships between at least the matter task codes and the client task codes. The time entry software module 52 receives time sheet data 60 and utilizes the matter task lists 56 to generate matter-coded timecard data 62 which is provided to the billing software module 54. As the Carpe Diem export file (e.g., the matter-coded time card data 62) contains matter task coding only, the billing software module 54 (ELBS) must export the time card data to the analysis software module 50 along with information pertaining to the relationship between the client and matter codes. The billing software module 54 identifies to the analysis software module 50 all timecards where the client code has been altered so that the matter code is no longer valid. An "actuals" table of the analysis software module 50 is populated with the new and modified timecard records 70.

The billing software module 54 also provides client, matter and timekeeper validation tables 64 to the time entry software module 52. In addition to generating client billing 66, the billing software module 54 provides client, matter and timekeeper tables 68 and new and modified timecard data 70 to the analysis software module 50. The tables 68 are initially populated and thereafter updated as necessary, for example, as a part of a nightly synchronization routine.

The analysis software module 50 generates and provides matter budget data 72 to the billing software module 54. More specifically, the analysis of software module 50 uses the timekeeper codes, the matter task code list, and starting and ending dates to generate timekeeper task budgets. In order to export this budget data to the matter budget tables in ELBS the analysis software module 50 must translate the budgets from matter codes to client codes using the pre-established code relationships. As an advanced feature, the analysis software module 50 may also be programmed to pro-rate budget amounts if the starting or ending dates occur inside billing period boundaries.

In addition to coordinating relationships between task lists, the analysis software module 50 generates task-based budgets 74 and (optionally) variance reports 76. More specifically, the analysis software module 50 processes the timecard information to generate the variance report 76 as well as client estimates such as the task-based budgets 74.

Figure 3:
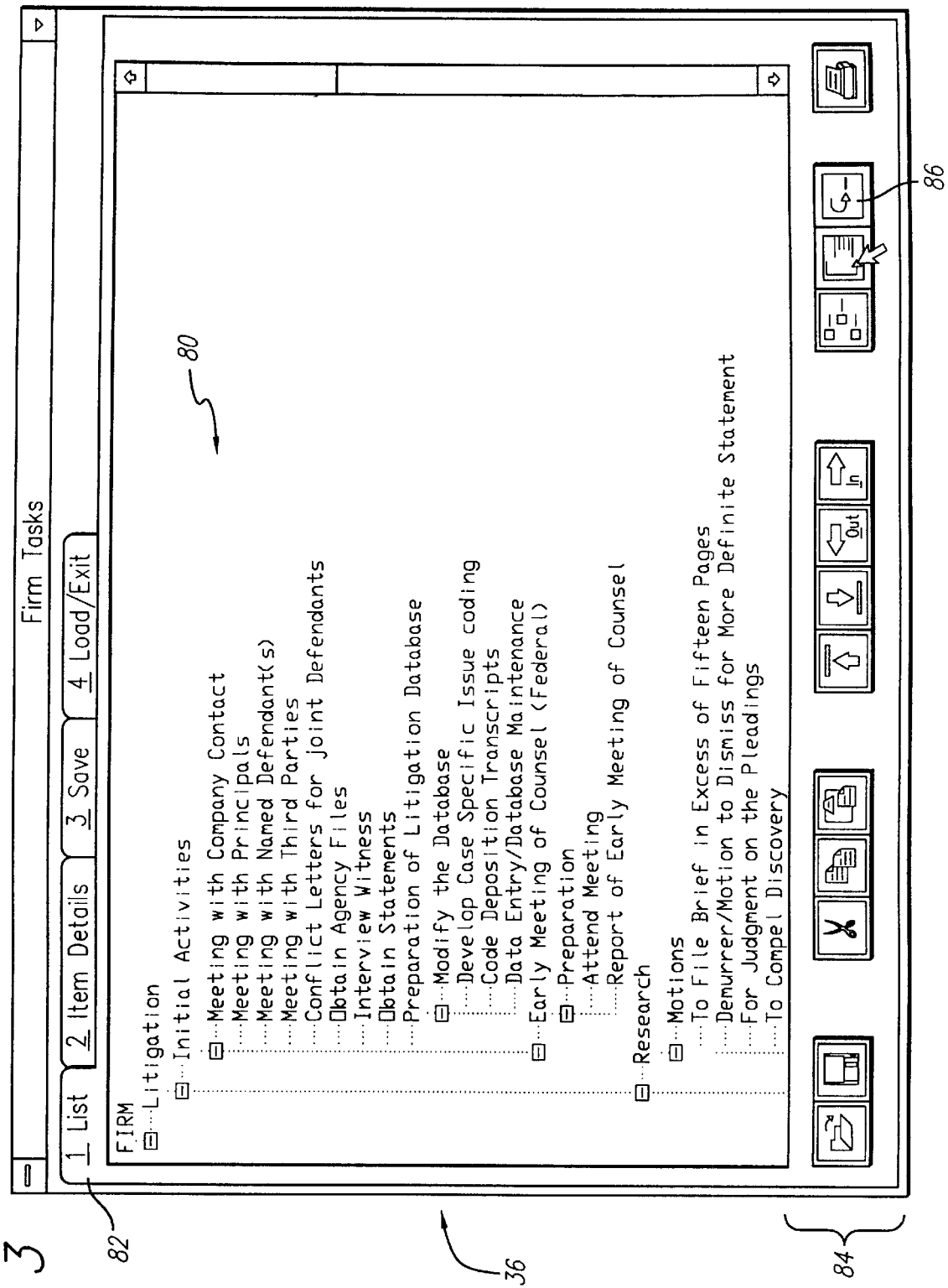
FIG. 3 shows a video display of the user interface of the present invention displaying a hierarchical firm task list in expanded form.

FIG. 3 shows the video display 36 of the user interface displaying a hierarchical firm task list 80 in expanded form. In a preferred embodiment, the user interface will be presented via Microsoft Windows or an alternative program providing user friendly input devices such as pull-down menus, icons and the like. The hierarchical firm task list 80 is displayed, for example, by positioning a screen cursor (not shown) over the folder tab 82 designated as "1 List" and double-clicking the mouse 40. The expanded firm task list 80 may be structured in any manner accommodating the organizational, accounting, financial or other needs of a product or service provider. Task lists are preferably hierarchical. In the case of a law firm, a main heading might be "Litigation" with the subheadings being established in consideration of the different stages of a typical lawsuit and the particular activities associated with each stage. Certain tasks are further subdivided to accommodate the particular needs of billing departments, a typical progression of activities, or the staffing requirements for certain tasks. Each element of the hierarchical firm task list 80 is preceded by a "–" symbol indicating that all sub-elements of that particular element are displayed. The display 36 additionally includes an icon field 84 along a bottom portion thereof. A collapse icon 86 will, for example, collapse the "Preparation", "Attend Meeting" and "Report of Early Meeting of Counsel" elements into the "Early Meeting of Counsel (Federal)" heading.

Figure 4:
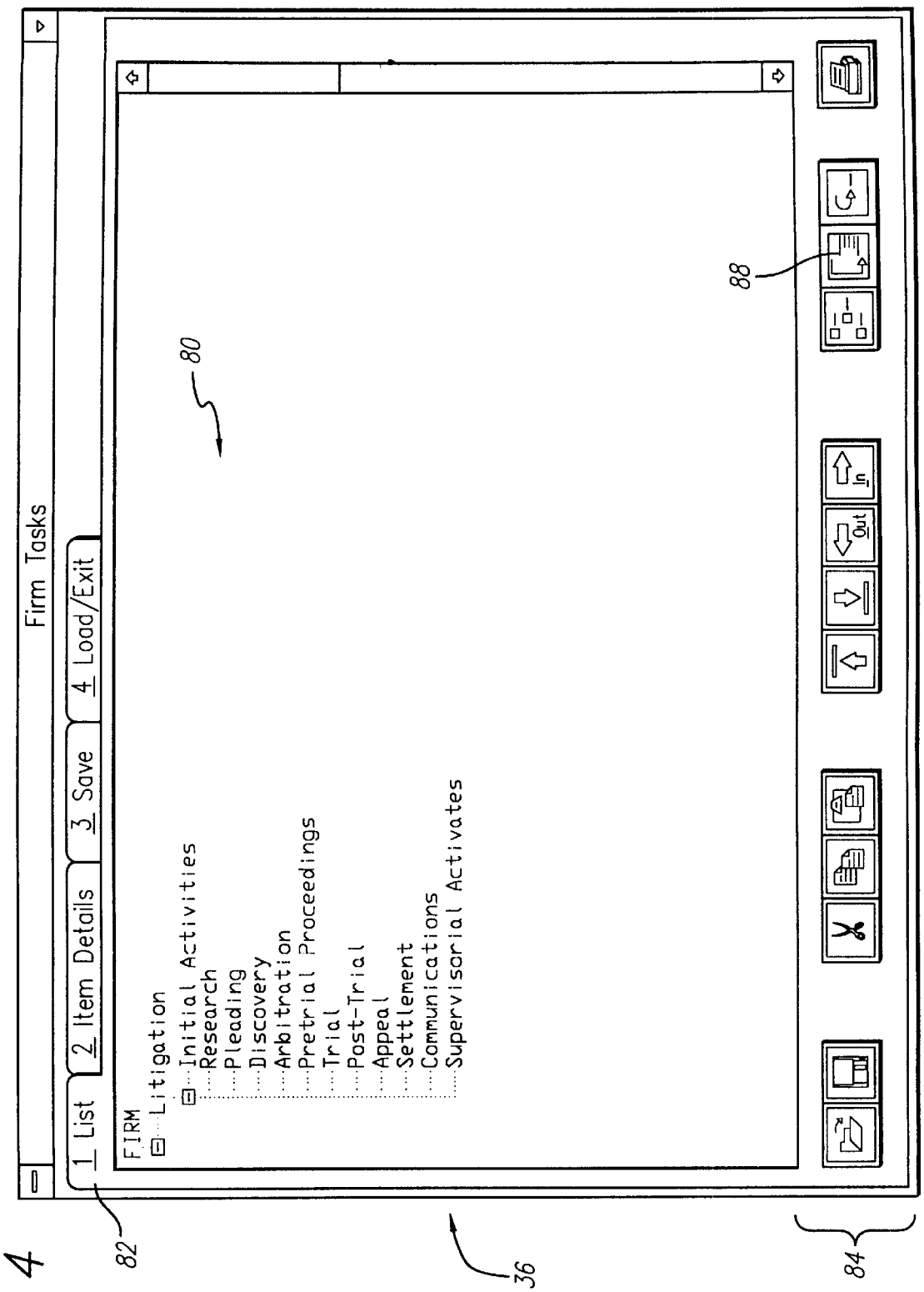
FIG. 4 shows the firm task list of FIG. 3 in collapsed form.

FIG. 4 shows the firm task list of FIG. 3 in collapsed form. If the collapsed icon 86 is actuated twice, the firm task list is collapsed and displayed as shown in FIG. 4. The user 42 can readily expand the firm task list back to the list shown in FIG. 3 by actuating an expand icon 88 two times. Each element including sub-elements which are not displayed is preceded by a "+" symbol.

Figure 5:
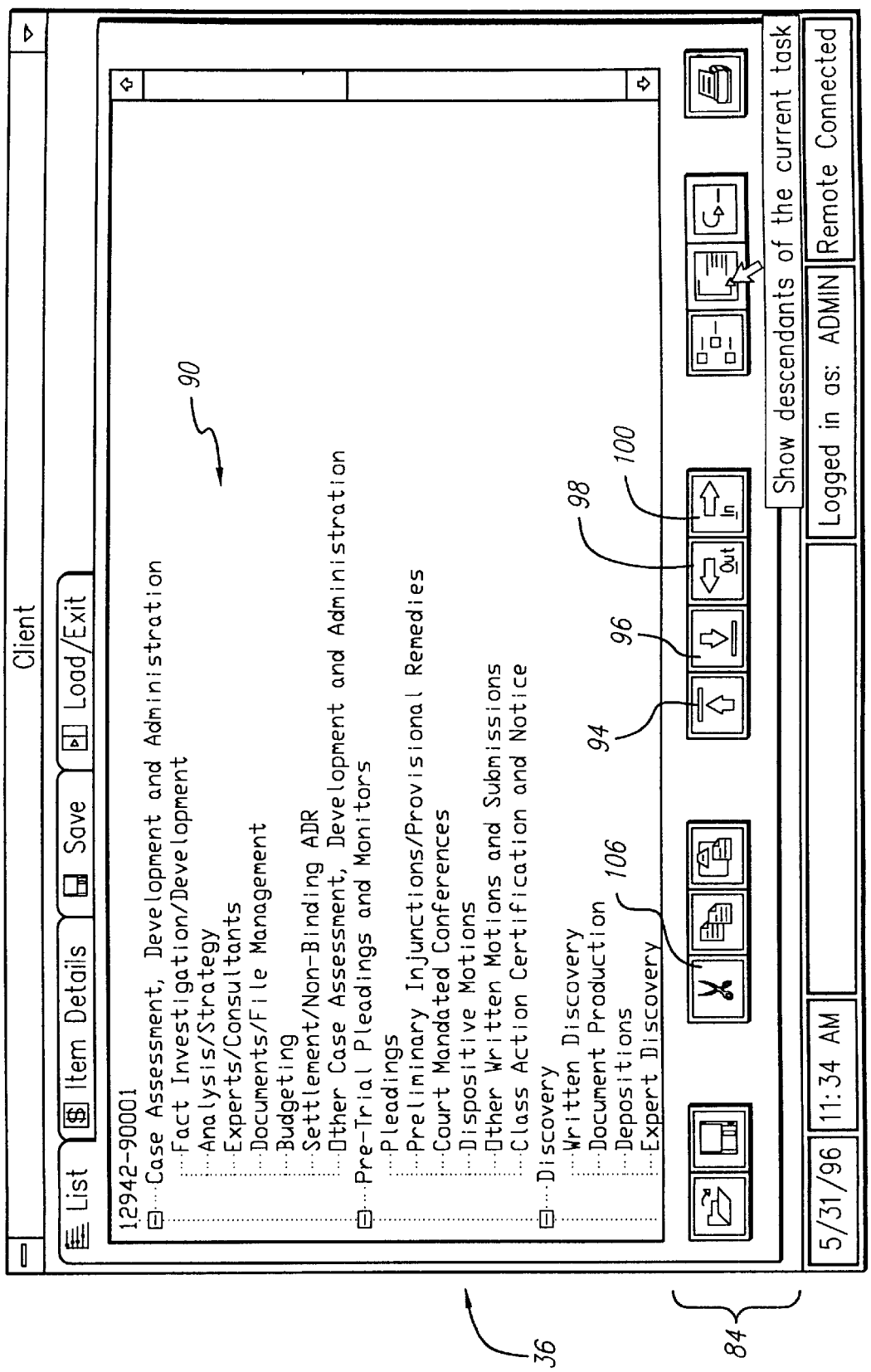
FIG. 5 shows the video display of the user interface displaying a hierarchical client task list.

FIG. 5 shows the video display 36 of the user interface displaying a hierarchical client task list 90. The icon field 84 additionally includes an up-arrow icon 94, a down-arrow icon 96, a left-arrow icon 98 and a right-arrow icon 100 for moving a selected task to different hierarchical levels. A cut icon 106 is employed to initiate an executable program for removing selected elements from the client task list 90.

Figure 6:
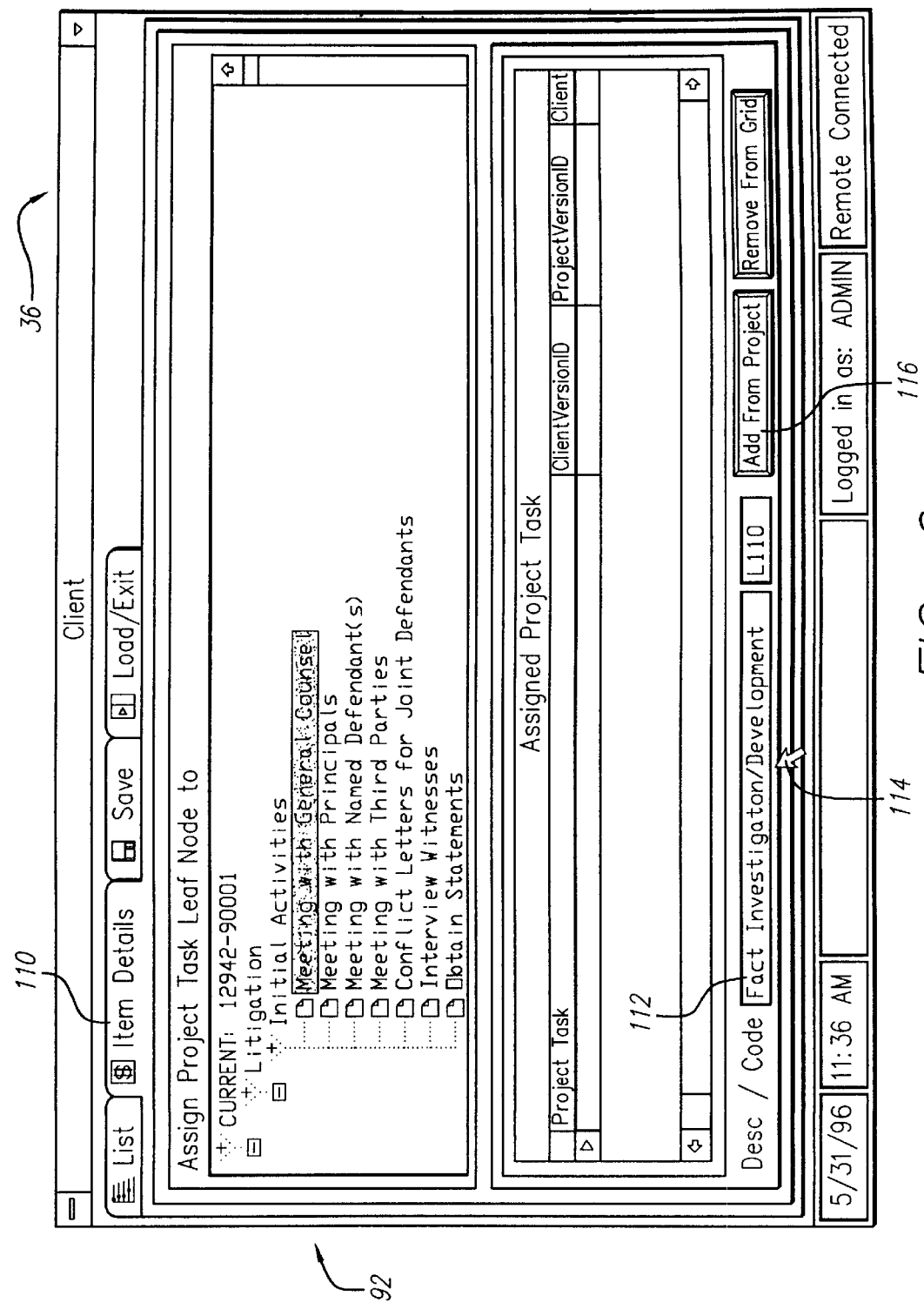
FIG. 6 shows a project task assigning window for assigning project tasks to a client list.

FIG. 6 shows a project task assigning window 92 for assigning project tasks to a client list. The project task assigning window 92 is actuated by, for example, moving a screen cursor over the folder tab 110 designated as "Item Details" and double clicking. A client task list description window 112 is identified in FIG. 6 by the screen cursor 114. The "Add From Project" display portion 116 of the window 92 is actuated to assign the selected project task "Meeting with General Counsel" to the client task list shown in window 112.

Figure 7:
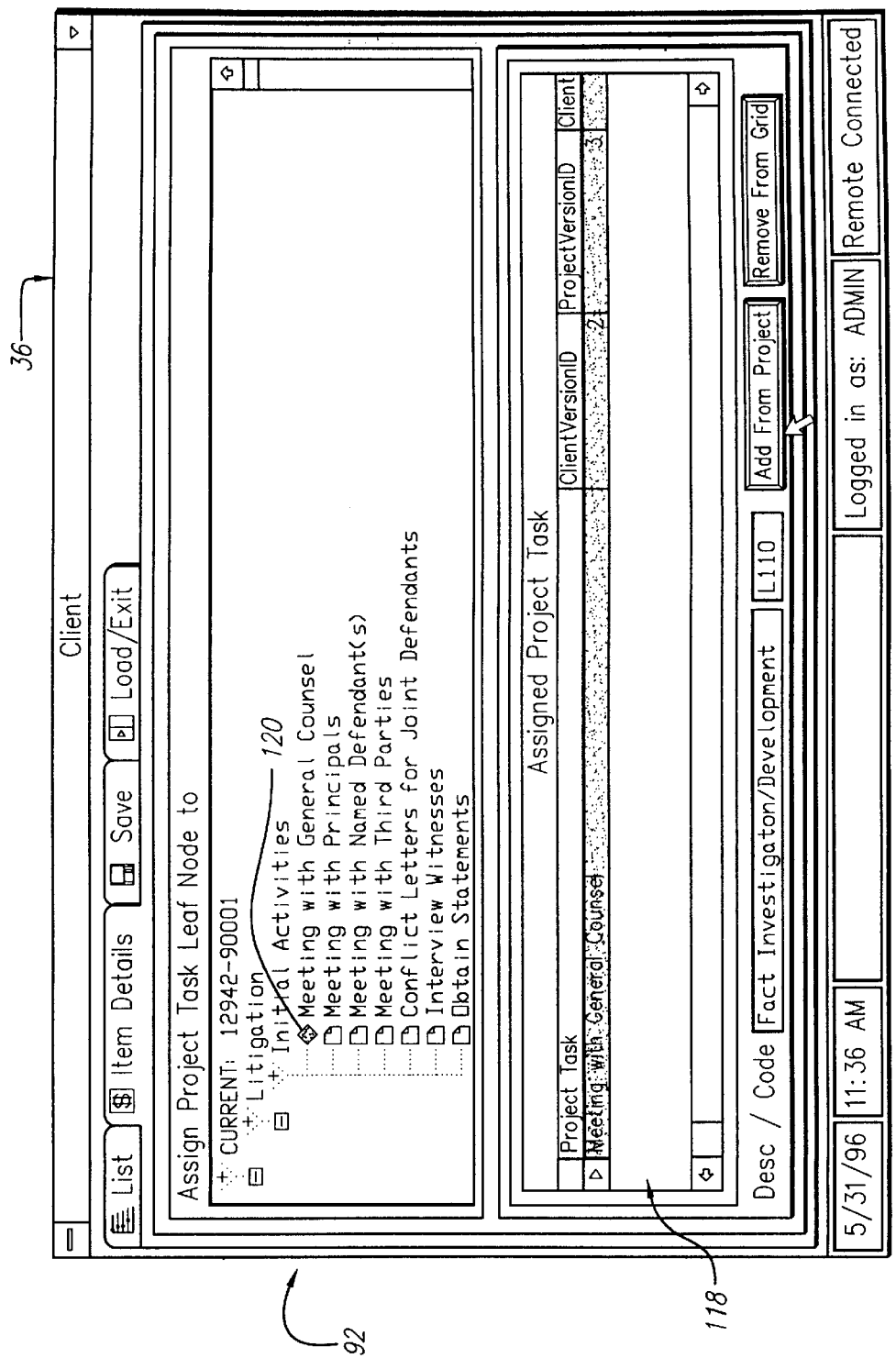
FIG. 7 shows the project task assigning window of FIG. 6 after a project task has been assigned to a client task list.

FIG. 7 shows the project task assigning window 92 of FIG. 6 after a project task has been assigned to a client task list. An Assigned Project Tasks window 118 indicates that the project task "Meeting with General Counsel" has been assigned as discussed above. An assigned task icon 120 appears adjacent to the project task after it has been assigned. Any number of project list tasks can be assigned to a client list task, but any particular project list task can only be associated with a single client list task. A discussion of how project list tasks are developed follows.

Figure 8:
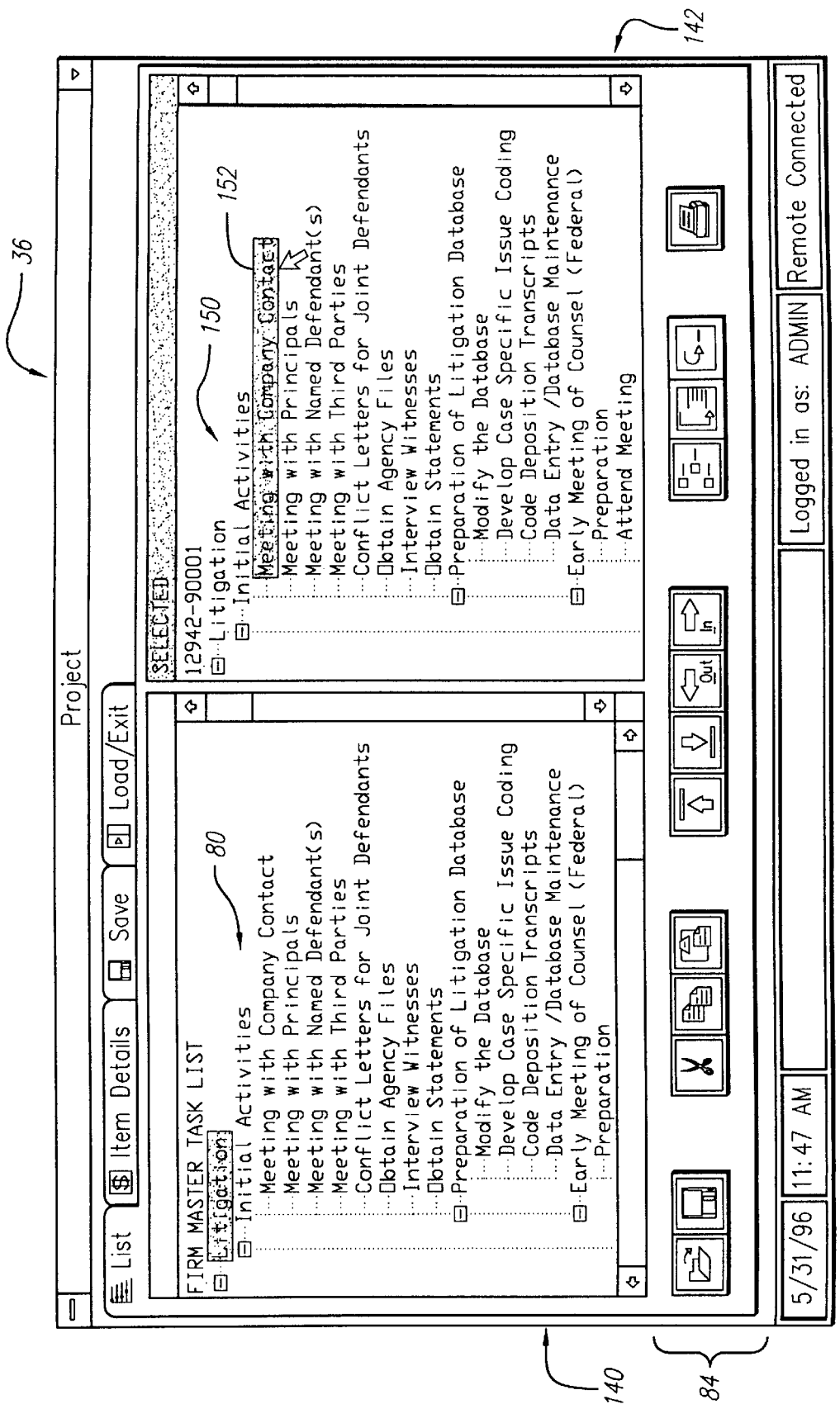
FIG. 8 shows two task list display windows respectively displaying the hierarchical firm task list and a hierarchical matter (or project) task list derived therefrom.

FIG. 8 shows two task list display windows 140, 142, respectively displaying the hierarchical firm task list 80 and a hierarchical matter (or project) task list 150 derived therefrom. The matter task list 150 preferably comprises tasks selectively copied from the firm task list 80 and modified or customized, if desired. After a text block 152 is positioned over a desired matter task, the folder tab 110 denoted as "Item Details" is actuated to provide the user 42 with a display substantially similar to that of FIG. 9 discussed below.

Figure 9:
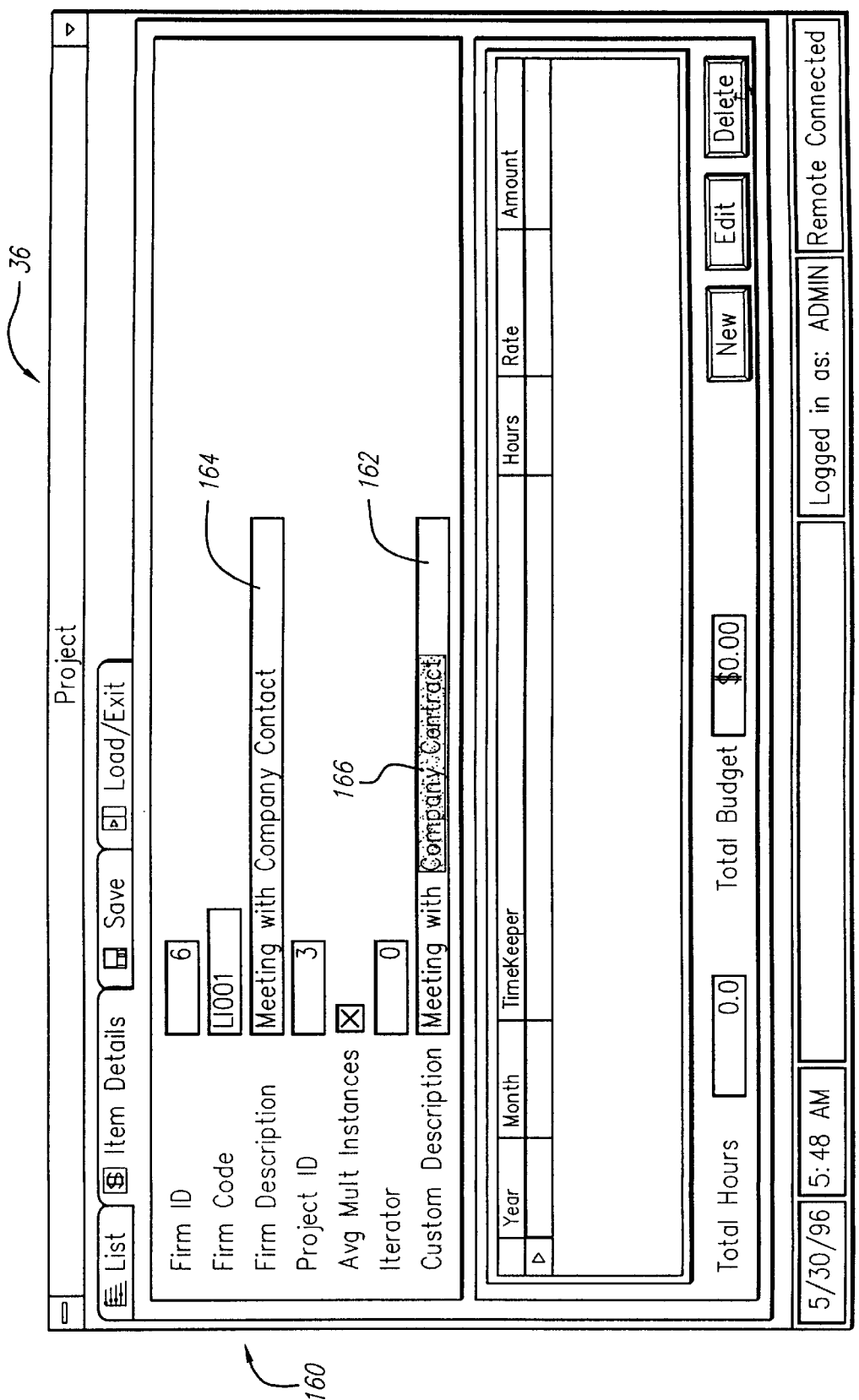
FIG. 9 shows a project task description input window for inputting a custom description of a project task.

FIG. 9 shows a project task description input window 160 for inputting a custom description of a project task. The custom description is shown in a Custom Description window 162 and is the same as the task shown in a Firm Description window 164 until customized or otherwise modified. For example, a portion of the description of the project task may be changed using a text block 166.

Figure 10:
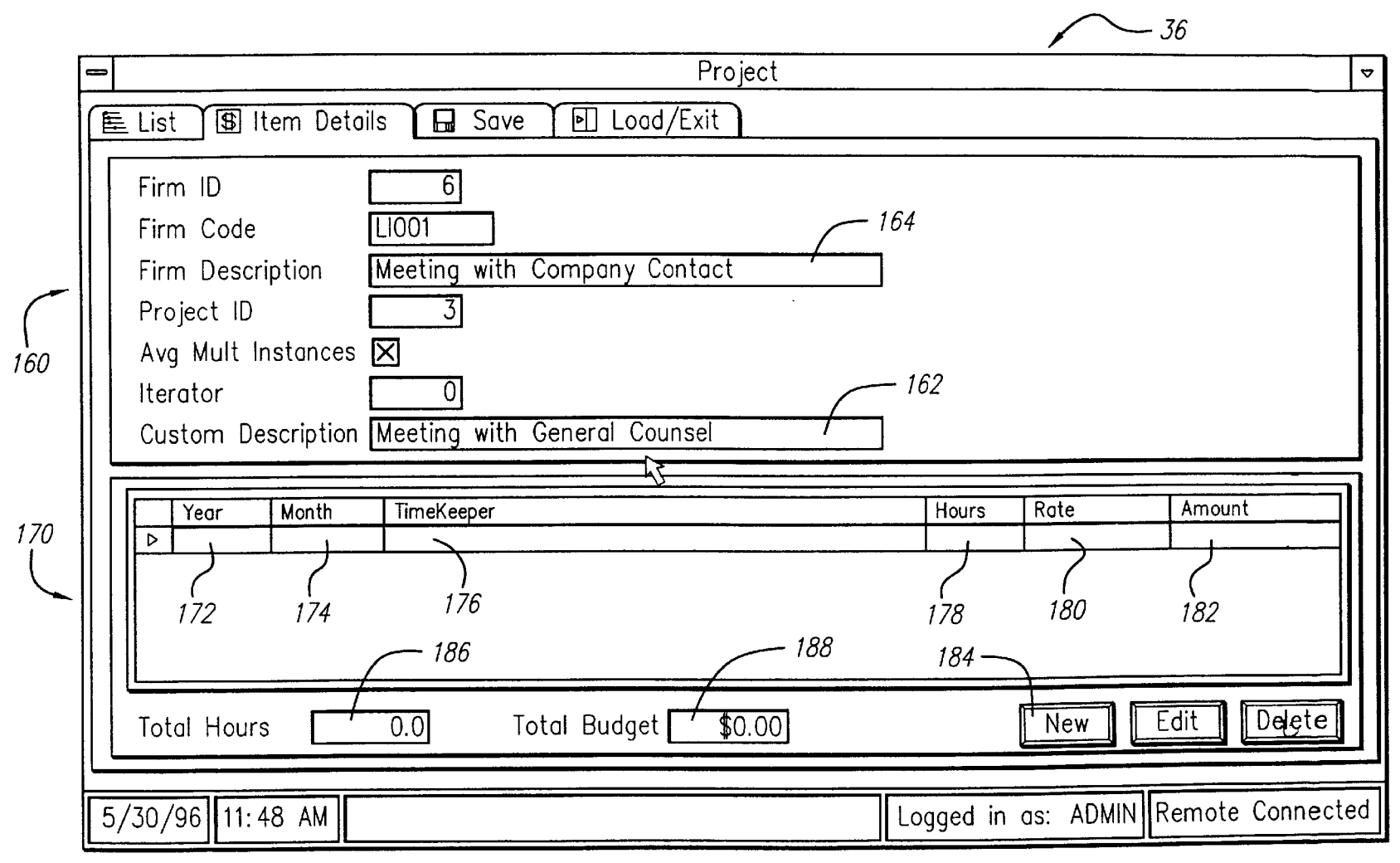

FIG. 10 shows the project task description input window 160 of FIG. 9 after a custom description of a project task has been input. The video display 36 also includes a project budget display window 170 including a year, month, timekeeper, hours, rate and amount fields 172, 174, 176, 178, 180, 182. A display portion 184 designated as "New" is actuated to add a new item to the budget for a particular project task. The total hours and budget for the project task are shown in windows 186, 188, respectively. A display such as that shown in FIG. 11 is presented to the user after the "New" display portion 184 is actuated.

Figure 11:
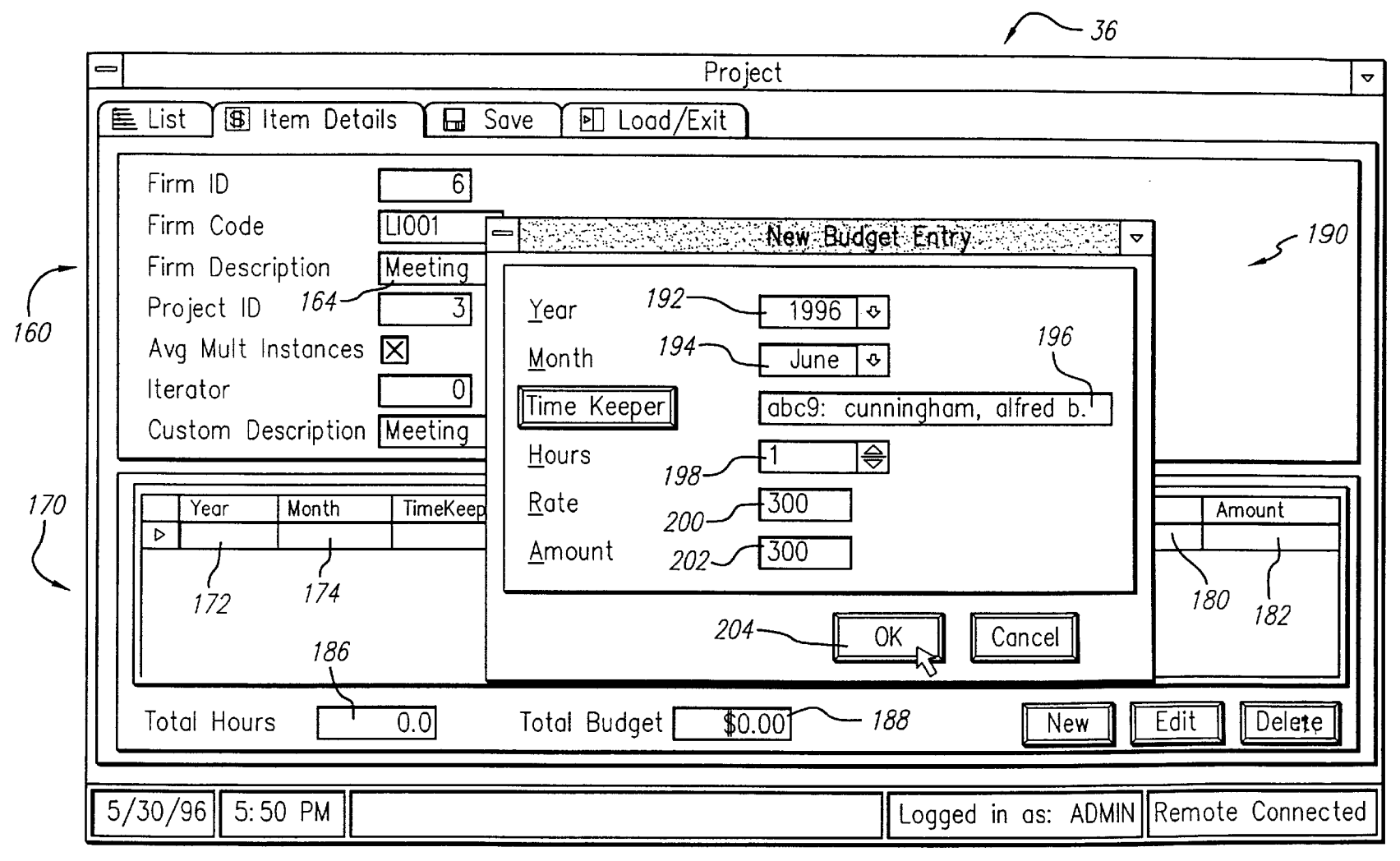

FIG. 11 shows the project task description input window of FIG. 10 with a New Budget Entry window 190 superimposed thereover. The window 190 is generated after the "New" display portion 184 is actuated and includes year, month, timekeeper, hours, rate and amount fields 192, 194, 196, 198, 200, 202. The window 190 shown in FIG. 11 has already had information entered into the above-described fields by the user. After the user is satisfied with the budget information entered, an "OK" display portion 204 is actuated and (although not shown in FIG. 11) the entered information thereafter appears in fields 172, 174, 176, 178, 180, 182, respectively (FIG. 10). The New Budget Entry window 190 allows multiple budget entries to be made for a particular project list task. In similar fashion, the total hours and amounts entered into fields 198, 202 are updated after each new budget entry is approved and displayed in fields 186, 188, respectively.

Figure 12:
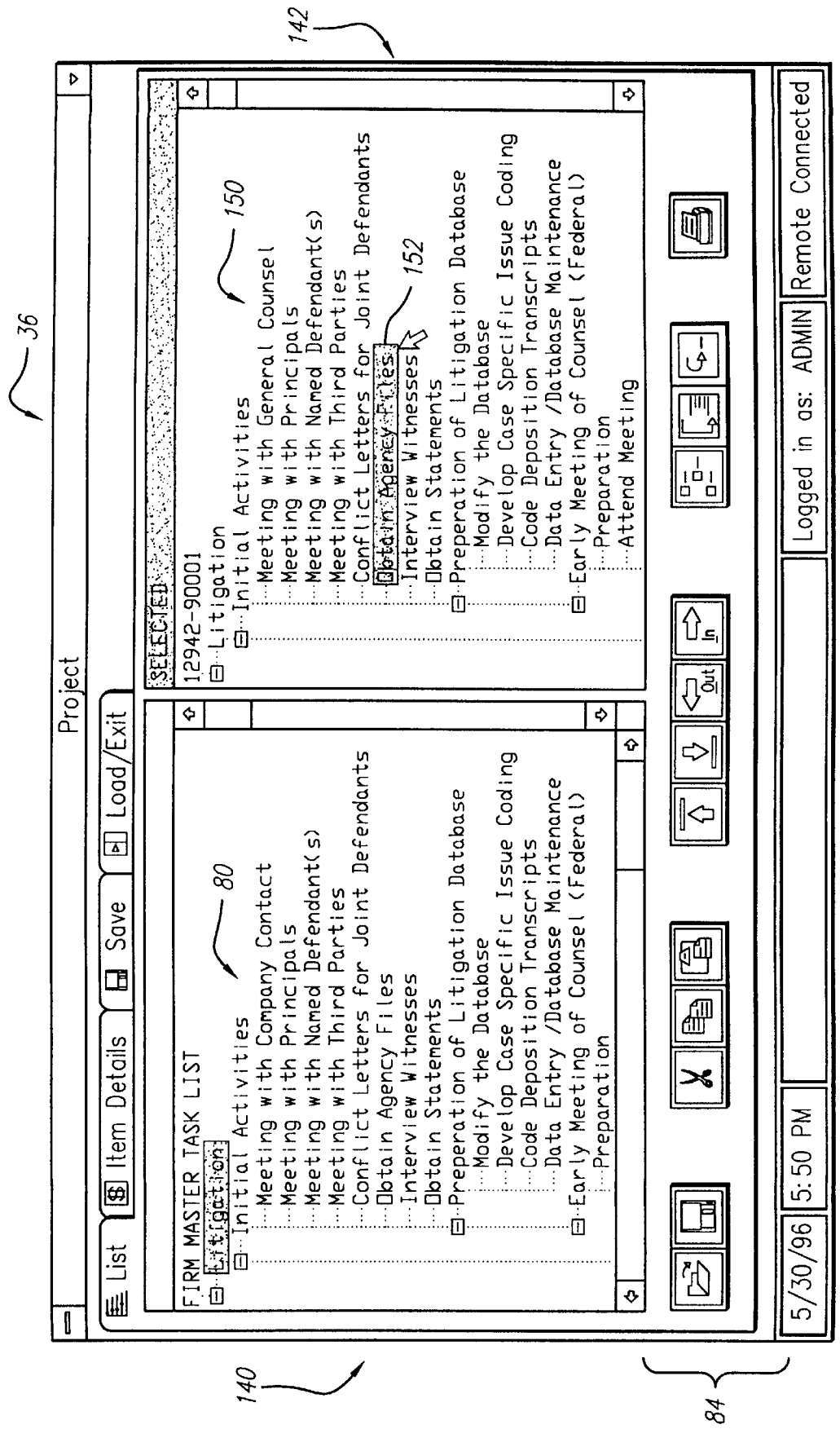
FIG. 12 shows the task list display windows of FIG. 8 after a custom description of a project task has been input.

FIG. 12 shows the task list display windows 140, 142 of FIG. 8 after the custom description of a project task has been input as described in the foregoing paragraphs.

In conclusion, it is to be understood that the foregoing detailed description and the accompanying drawings illustrate the principles of the invention. However, various changes and modifications may be employed without departing from the spirit and scope of the invention. Thus, by way of example and not of limitation, the system of the present invention may be employed to coordinate relationships between groups of information other than task lists. Information products other than task-based budgets may also be generated by the system. Accordingly, the present invention is not limited to the specific form shown in the drawings and described in detail hereinabove.

What is claimed is:

1. A task-based classification and analysis system, comprising:
    a computer system having a video display and a user input mechanism, said computer system executing:
    (a) a task-based budget analysis software module, comprising:
        a firm task list comprising a set of legal task elements;
        means for generating a matter task list comprising a first subset of said set of legal task elements of said firm task list selected by a user in accordance with a requirement of a project;
        means for generating a client task list comprising a second subset of said set of legal task elements of said firm task list selected by a user in accordance with a requirement of a client of a firm; and
        means for generating task code tables embodying a predetermined relationship between elements of said matter task list and elements of said client task list;
    (b) a time entry software module, comprising:
        means for generating matter-coded timecard data from said matter task list, time sheet data, and client, matter and timekeeper tables received by an import directory of said time entry software module; and
        means for automatically transferring said client, matter and timekeeper tables to said time entry software module;
    (c) a software module, comprising:
        means for generating client billing from task code tables and matter-coded timecard data;
        means for identifying to said task-based budget analysis modified timecard data that are no longer valid; and
    (d) wherein said task-based budget analysis software module generates a time task budget from the timekeeper codes, the matter task list, and starting and ending dates, and translates said time task budget from matter codes to client codes using said predetermined relationship, and further wherein said task-based budget analysis software module pro-rates budget amounts if starting and ending dates occur inside of a predetermined billing period, and even further wherein said task-based budget analysis software module generates variance report from said timecard data.

2. A task-based classification and analysis system, comprising:
    a computer system having a video display and a user input mechanism, said computer system executing:
    (a) a task-based budget analysis software module, comprising:
        a firm task list comprising a set of legal task elements;
        means for generating a matter task list comprising a first subset of said set of legal task elements of said firm task list selected by a user in accordance with a requirement of a project;
        means for generating a client task list comprising a second subset of said set of legal task elements of said firm task list selected by a user in accordance with a requirement of a client of a firm; and
        means for generating task code tables embodying a predetermined relationship between elements of said matter task list and elements of said client task list;
    (b) a time entry software module, comprising:
        means for generating matter-coded timecard data from said matter task list, time sheet data, and client, matter and timekeeper tables; and
    (c) a billing software module, comprising:
        means for generating client billing from task code tables and matter-coded timecard data.

3. The task-based classification and analysis system of claim 2, wherein said time entry software module includes an import directory for receiving said matter task list.

4. The task-based classification and analysis system of claim 3, wherein said import directory is configured to receive said client, matter and timekeeper tables.

5. The task-based classification and analysis system of claim 4, wherein said matter task list and client, matter and timekeeper validation tables are automatically transferred to said entry software module.

6. The task-based classification and analysis system of claim 2, wherein said billing software module identifies to said task-based budget analysis sore module modified timecard data that are no longer valid.

7. The task-based classification and analysis system of claim 6, wherein said task-based budget analysis sore module includes an actuals table that is populated by said modified timecard data.

8. The task-based classification and analysis system of claim 2, wherein said billing software module provides client, matter and timekeeper tables to the task-based budget analysis software module.

9. The task-based classification and analysis system of claim 8, wherein client, matter and timekeeper tables are updated as part of a nightly synchronization routine.

10. The task-based classification and analysis system of claim 2, wherein the task-based budget analysis software module generates a time task budget from the timekeeper codes, the matter task list, and starting and ending dates.

11. The task-based classification and analysis system of claim 10, wherein the task-based budget analysis software module translates said time task budget from matter codes to client codes using said predetermined relationship.

12. The task-based classification and analysis system of claim 11, wherein the task-based budget analysis software module pro-rates budget amounts if starting and ending dates occur inside of a pre-determined billing period.

13. The task-based classification and analysis system of claim 10, wherein the task-based budget analysis software module pro-rates budget amounts if starting and ending dates occur inside billing period boundaries.

14. The task-based classification and analysis system of claim 10, wherein the task-based budget analysis software module generates a variance report from said timecard data.

15. The task-based classification and analysis system of claim 2, wherein the task-based budget analysis software module generates a variance report from said timecard data.

16. A method for a task-based classification and analysis system, comprising:

generating a firm task list comprising a set of legal task elements;

generating a matter task list comprising a first subset of said set of legal task elements of said firm task list selected by a user in accordance with a requirement of a project;

generating a client task list comprising a second subset of said set of legal task elements of said firm task list selected by a user in accordance with a requirement of a client of a firm;

generating task code tables embodying a predetermined relationship between elements of said matter task list and elements of said client task list;

generating matter-coded timecard data from said matter task list, time sheet data, and client, matter and timekeeper tables; and generating client billing from task code tables and matter-coded timecard data.

* * * * *